Oct. 29, 1940.   S. G. NEGRICH   2,219,817
WELDING ELECTRODE
Filed Sept. 22, 1939

Samuel G. Negrich
INVENTOR.
BY Stanley Lightfoot
ATTORNEY.

Patented Oct. 29, 1940

2,219,817

UNITED STATES PATENT OFFICE 2,219,817

WELDING ELECTRODE

Samuel G. Negrich, Detroit, Mich.

Application September 22, 1939, Serial No. 296,018

2 Claims. (Cl. 219—8)

This invention relates to welding electrodes of the rod or wire type such as are utilized in jaw-equipped holders. These welding wires have invariably been simply in the form of a continuously cylindrical wire of suitable length which is gripped by the jaws of the holder at any convenient point. Sometimes to increase the grip the jaws of the holders are notched to receive the wire. Unless the notch is precisely formed to agree with the wire diameter, no material benefit is gained, and, in any case, the angles at which the wire may be set in the holder are greatly restricted.

The present invention, although mechanically very simple, has for its object, not only to increase the firmness with which the welding wire may be held, but to materially reduce heating at the point of holding and increase the heat at the working end of the wire, thereby enhancing the welding properties of the wire.

Further advantages resulting from the construction or operation of the invention as it may be carried into effect will become readily apparent to those skilled in the welding art from the accompanying disclosure.

In carrying the said invention into effect, I may provide the novel form of welding wire hereinafter described and shown on the accompanying drawing, wherein.

Similar characters of reference indicate similar parts in the several figures of the drawing.

The body of the welding wire 10 is simply flattened to provide grip surfaces 11 on opposite sides thereof, and shoulders 12 where the flat surfaces merge into the cylindrical body of the wire. These flat surfaces are shown in Figures 1, 2, 6 and 7, as being parallel to each other so that with a common type of holder, as shown in dotted lines, the parallel jaws will readily contact a material area of the said surfaces whereby a free, full and unobstructed flow of current through the wire will be assured. As distinguished from the substantially point contact obtaining in the old method of holding a round wire in such a holder, a marked freedom from heating of the holder and a much hotter welding heat at the working end of the wire is attained. Furthermore, the shoulder 12 prevents endwise movement of the wire between the jaws, such as when the end of the wire is tapped on a solid surface for the purpose of clearing the point of the wire.

Due to the more efficient grip afforded by the flattened surfaces, simpler and less expensive holders may be employed. It is preferred that the combined width of the two flat surfaces approximate the circumference of the wire.

Figure 1:
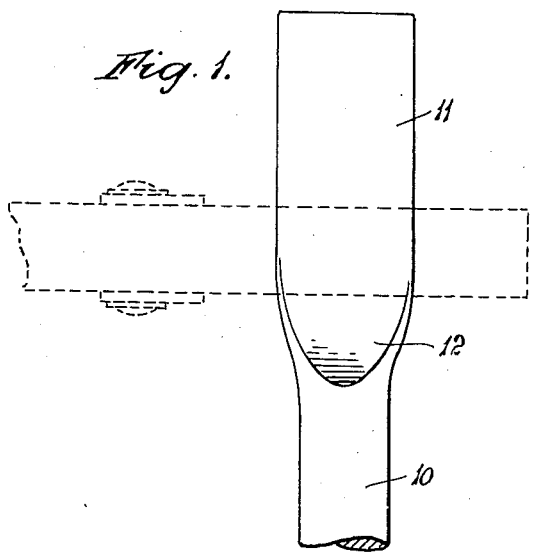
Figure 1 is a side elevation of the end of a welding wire constructed in accordance with the said invention.
Figure 2:
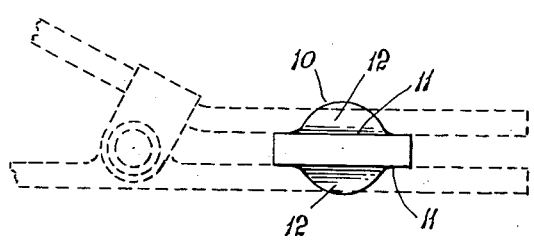
Figure 2 is a plan of the same.
Figure 3:
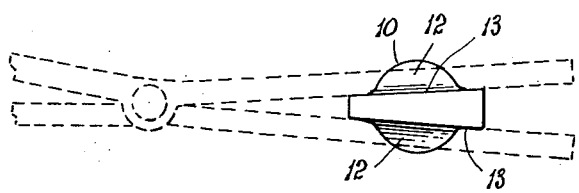
Figure 3 is a similar plan illustrating a modified form of the grip portion of the wire.
Figure 5:
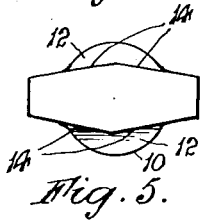
Figure 5 is also a plan of a modified grip portion.

In cases where it may be desired to provide especially for holders having jaws which do not close in substantially parallel relation, it may be desirable to make the flattened portion of the wire with the sides 13 converging toward one edge of the flattened portion, as shown in Figure 3; or toward opposite edges of the said portion as shown at 14 in Figure 5. In the latter case the grip portion of the wire does not have to be inserted in the jaws of the holder in one way only, as in the case of the grip section of Figure 3.

Figure 4:
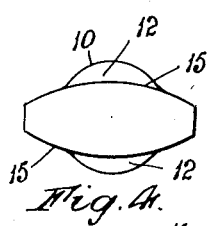
Figure 4 is a plan of a further modification of the grip portion of the wire.

Figure 4 shows a grip section somewhat similar to that of Figure 5, except that the surfaces are somewhat rounded. The increased radius of the arc of the said surfaces 15 gives the desired increased contact area for the jaws of the holder, although not quite the same extent as in the case of the other examples.

Figures 6, 7:
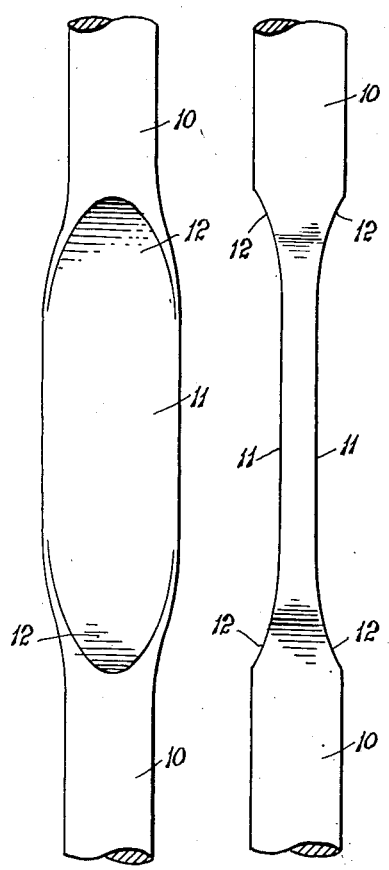
Figures 6 and 7 are side elevations of the wire showing the grip portion at other than the end of the wire.

Although the flattened grip portions are preferably contiguous to the ends of the wire, they may be remote from the ends as shown in Figures 6 and 7, either end of the wire then being available for welding.

This invention may be developed within the scope of the appended claims without departing from the spirit of the said invention and it is desired that the specification and drawing be read as being merely illustrative and not in a limiting sense, except as necessitated by the prior art.

What I claim is:

1. A round elongated welding wire having a grip portion characterized by flat surfaces on opposite sides of one end of the wire, for engagement in the jaws of a holder, and shoulders contiguous to the flat surfaces to abut the jaws of such holder.

2. A round elongated welding wire having a grip portion characterized by flat surfaces on opposite sides of one end of the wire for engagement in the jaws of a holder, and shoulders contiguous to the flat surfaces to abut the jaws of such holder, the combined width of the flat surfaces being substantially equal to the circumference of the wire.

SAMUEL G. NEGRICH.